(12) United States Patent
McLean et al.

(10) Patent No.: US 7,252,169 B2
(45) Date of Patent: Aug. 7, 2007

(54) WINDROWER REAR AXLE SUSPENSION SYSTEM

(75) Inventors: Kenneth W. McLean, New Holland, PA (US); Donald L. Osborne, Quarryville, PA (US); David M. DeChristopher, Akron, PA (US)

(73) Assignee: CNH America LLC, New Holland, PA (US)

( * ) Notice: Subject to any disclaimer, the term of this patent is extended or adjusted under 35 U.S.C. 154(b) by 371 days.

(21) Appl. No.: 10/966,283

(22) Filed: Oct. 15, 2004

(65) Prior Publication Data

US 2006/0090445 A1 May 4, 2006

(51) Int. Cl.
*B62D 61/12* (2006.01)
(52) U.S. Cl. .................................................. 180/209
(58) Field of Classification Search ............... 180/209; 280/124.133, 124.134, 124.157
See application file for complete search history.

(56) References Cited

U.S. PATENT DOCUMENTS

| | | | | |
|---|---|---|---|---|
| 1,334,475 A * | 3/1920 | Weaver | | 180/209 |
| 2,218,510 A * | 10/1940 | Albertson et al. | | 180/210 |
| 2,278,303 A | 3/1942 | Blaser | | 280/124 |
| 2,401,209 A | 5/1946 | Wilfert et al. | | 280/106.5 |
| 3,154,164 A * | 10/1964 | Shaw et al. | | 180/209 |
| 3,180,653 A | 4/1965 | Passman | | 280/30 |
| 3,455,404 A * | 7/1969 | Hansen | | 180/209 |
| 3,662,962 A | 5/1972 | Cobey | | 241/101 M |
| 4,350,222 A * | 9/1982 | Lutteke et al. | | 180/209 |
| 5,039,129 A * | 8/1991 | Balmer | | 180/308 |
| 5,282,644 A * | 2/1994 | Larson | | 280/638 |
| 5,778,569 A | 7/1998 | Schaeff | | 37/410 |
| 6,139,045 A * | 10/2000 | Vandenbark et al. | | 180/209 |
| 6,206,125 B1 * | 3/2001 | Weddle | | 180/209 |
| 6,224,083 B1 * | 5/2001 | Tyler | | 280/476.1 |
| 6,349,952 B1 | 2/2002 | Kallstrom | | 280/124.157 |
| 6,398,242 B1 | 6/2002 | Niwa et al. | | 280/124.11 |
| 6,488,110 B2 | 12/2002 | Price | | 180/251 |
| 6,551,050 B1 * | 4/2003 | Kallevig et al. | | 414/607 |
| 6,607,204 B2 | 8/2003 | Krone et al. | | 280/124.11 |
| 6,651,995 B1 | 11/2003 | Buttner | | 280/124.157 |
| 6,793,248 B1 * | 9/2004 | Sung | | 280/781 |
| 7,044,251 B2 * | 5/2006 | Mast | | 180/209 |
| 2003/0071431 A1 | 4/2003 | Carlstedt | | 280/124.152 |
| 2004/0090035 A1 | 5/2004 | Warinner | | 280/124.163 |
| 2005/0167961 A1 * | 8/2005 | Murata et al. | | 280/755 |

* cited by examiner

*Primary Examiner*—Paul N. Dickson
*Assistant Examiner*—Barry Gooden, Jr.
(74) *Attorney, Agent, or Firm*—John William Stader; Michael G. Harms

(57) ABSTRACT

A suspension system for the rear axle of a self-propelled agricultural windrower. The axle is split into two components, each having an air spring to absorb shocks. The two air springs are interconnected by a tube to equalize the internal pressure. A pair of pins can be inserted through the respective axle components and a structural member of the tractor to fix the components relative to the unit structure, thereby incapacitating the suspension and permitting effective steering of the tractor in the absence of a header.

20 Claims, 3 Drawing Sheets

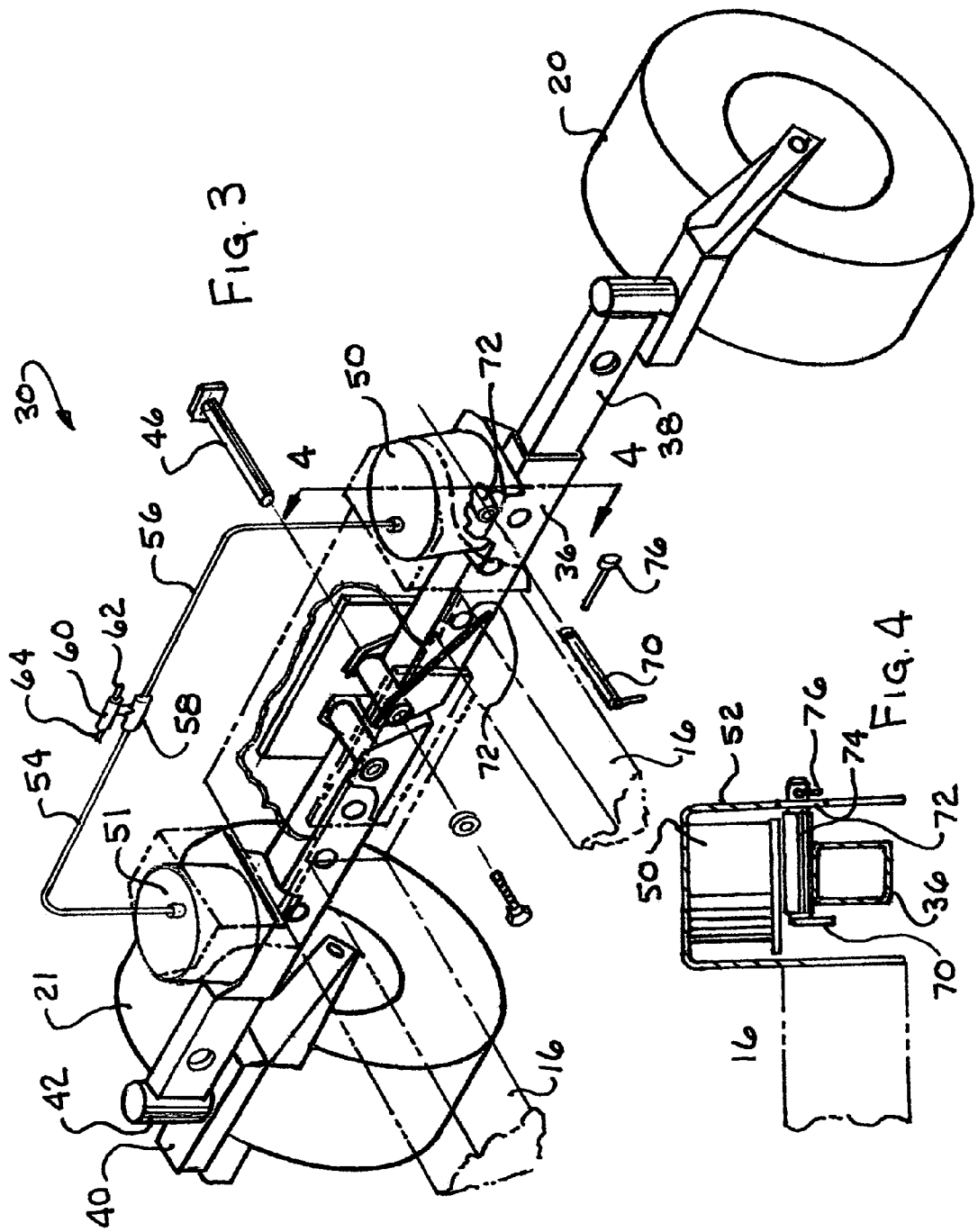

WINDROWER REAR AXLE SUSPENSION SYSTEM

BACKGROUND OF THE INVENTION

The present invention relates generally to agricultural self-propelled windrowers, and more particularly to a rear axle suspension system for such machines.

Self-propelled windrowers have been used in farming operations for several decades. Generally, the self-propelled windrower is designed to cut and process hay and other crops. More specifically, a windrower of the type under consideration here includes a tractor and a separate header. The tractor has a pair of drive wheels on the forward end and a pair of pair of tricycle-like wheels on the rear end. The wheels support a main frame that carries the engine between the wheel pairs and a drive train. A cab provides an enclosed environmentally controlled operator's platform generally above the drive wheels. A variety of crop-harvesting headers are selectively attachable to the forward end of the unit to provide the operator with a choice of tools with which to handle the crops.

In past designs, the rear axle was a single beam (known as a "walking beam") with very little suspension to ease the ride for the operator. Substantially every obstacle encountered by the rear wheels transmitted a "bounce" or vibration directly through the chassis to the operator's platform, making the ride uncomfortable and tiring, and thus resulting in lower field operation speeds. It is a unique characteristic of this type windrower that when driven without the significant weight of a header, the majority of the weight is shifted to the rear wheels. This causes the rear of the unit to squat and it becomes difficult to turn because the tail forks cannot freely pivot.

It would be a significant advantage in this technology to solve the above-identified problems by providing a suspension system that provides a comfortable ride for the operator during field operation, with higher operation speeds, yet allows safe and effective operation when the unit is driven without a header.

SUMMARY OF THE INVENTION

Accordingly, it is an object of the present invention is to provide a self-propelled windrower rear axle suspension system.

Another object of the present invention is to provide a rear axle suspension system for an agricultural windrower that efficiently and effectively permits faster operating speeds than previously known.

It is another object of the instant invention to provide a rear axle suspension system for a windrower that employs a split rear axle with an air spring associated with each side to independently absorb shocks.

Yet another object of the present invention is to provide a rear axle suspension system for a self-propelled windrower with a split rear axle with an air spring associated with each side to absorb shocks, and a mechanism for selectively fixing the relationship between the split axle components.

It is yet another object of this invention to provide a rear axle suspension system for a windrower that is durable in construction, inexpensive of manufacture, carefree of maintenance, facile in assemblage, and simple and effective in use.

These and other objects are attained by providing a suspension system for the rear axle of a self-propelled agricultural windrower. The axle is split into two components, each having an air spring to absorb shocks. The two air springs are interconnected by a tube to equalize the internal pressure. A pair of pins can be inserted through the respective axle components and a structural member of the tractor to fix the components relative to the unit structure, thereby incapacitating the suspension and permitting effective steering of the tractor in the absence of a header.

DESCRIPTION OF THE DRAWINGS

The advantages of this invention will be apparent upon consideration of the following detailed disclosure of the invention, especially when taken in conjunction with the accompanying drawings wherein:

FIG. 3 is a partial frontal perspective view of the suspension system; and

FIG. 4 is a partial sectional view, taken along lines 4-4 of FIG. 3.

DESCRIPTION OF THE PREFERRED EMBODIMENT

Figure 1:
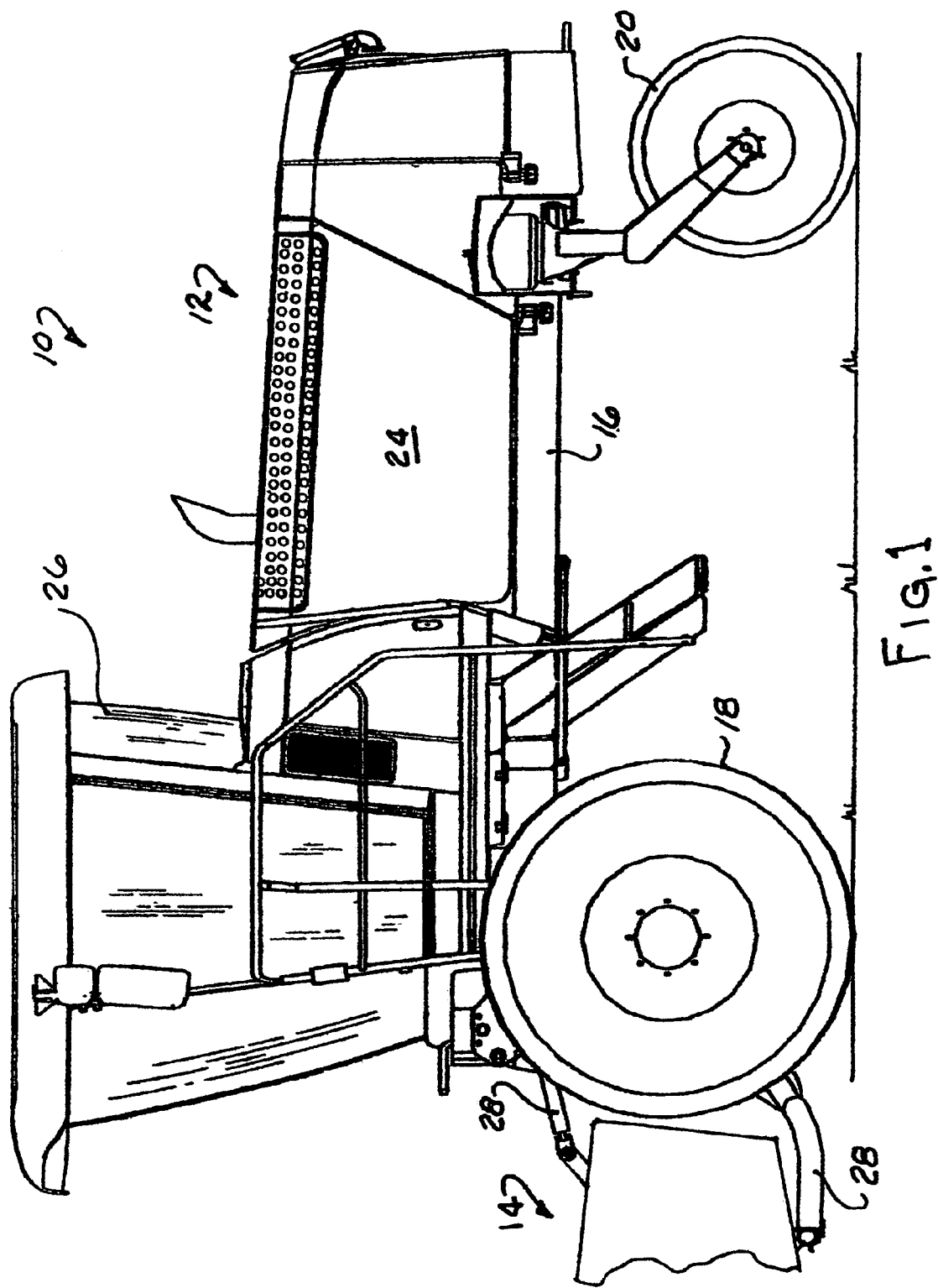
FIG. 1 is a side plan view of a windrower, with header, showing portions of the suspension system herein discussed.

FIG. 1 shows the two primary components of a self-propelled windrower 10, i.e., tractor 12 and header 14. Tractor 12 has a main frame 16, with a longitudinal horizontal axis from front to back, that is supported by a pair of drive wheels 18 (only one shown) on the forward portion thereof and a pair of rear wheels 20, 21 (see FIG. 2 for both wheels) adjacent the rear end. An engine, located under cowling 24, a transmission and other components, all well known in the art, are supported on the main frame 16 and provide the power necessary for the machine to operate. A cab 26, also supported on the main frame, encloses the operator's platform to provide an environmentally controlled location from which the windrower may be comfortably operated.

Header 14 may be of several designs, but typically comprises a cutting mechanism, either a sicklebar or rotary cutter, a feeder mechanism and conditioning rolls. The header is supported by a hydraulic lift and flotation structure 28 that may be activated to selectively raise or lower the header between transport and operational positions. It is significant to note here that the rotary cutter operates at such speed and efficiency that operational speed of the windrower is limited not so much by the efficiency of the header, but more so by the comfort of the operator and the long term integrity of the windrower itself. The rear axle suspension system on the typical self-propelled windrower is such that bumps and irregularities in the field are directed through the chassis to the operator. The higher the speed of the windrower, the more stress the chassis is subjected to, and the more discomfort experienced by the operator. The rear axle suspension system to be described herein reduces this stress and discomfort, making it possible to operate the windrower at a higher ground speed and thus greater crop throughput.

Figure 2:
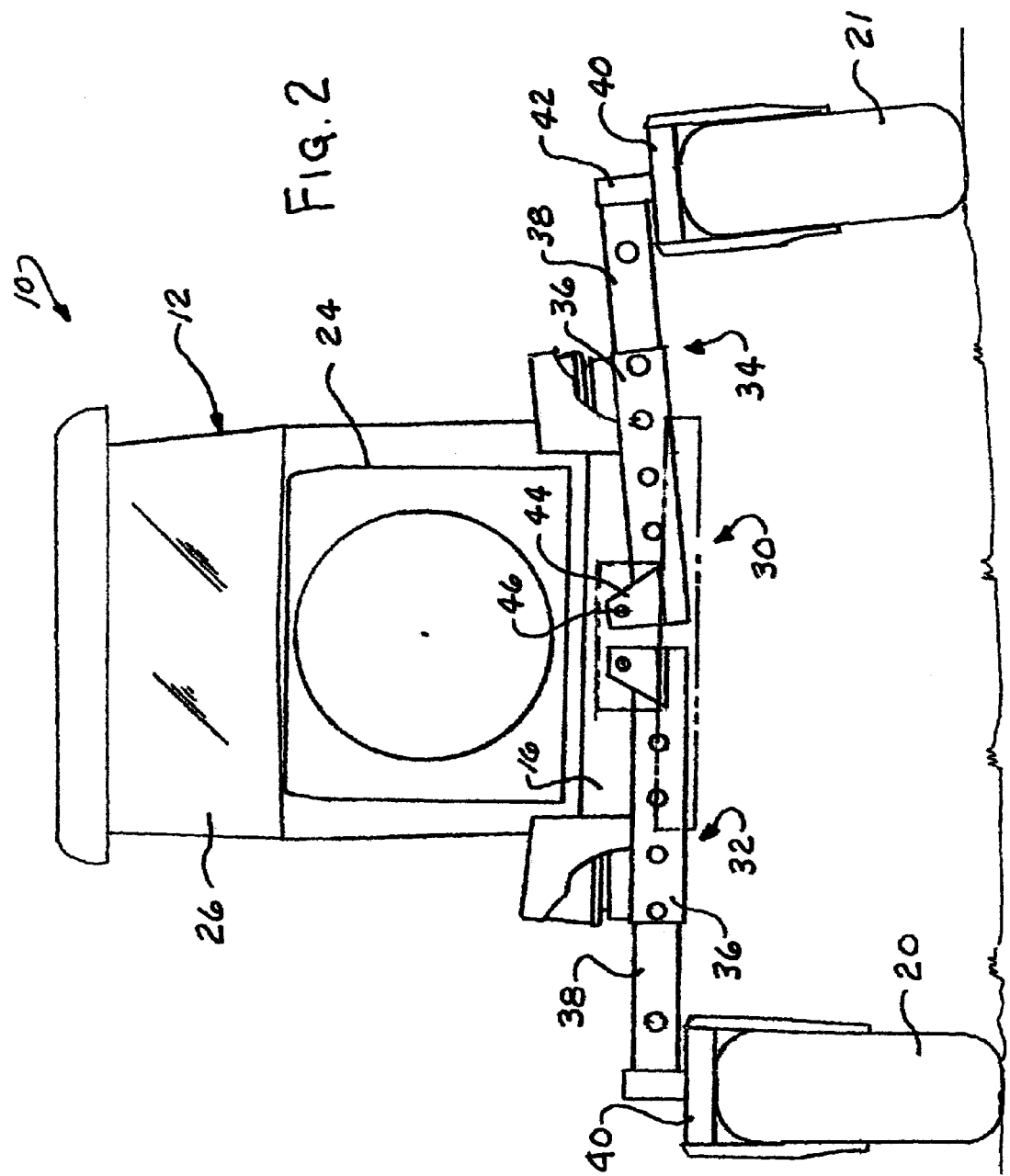
FIG. 2 is partial rear view of the windrower of FIG. 1, without header, showing a partial break-away of the suspension system.

FIG. 2 shows a general rear view of the windrower 10, with a depiction of the main elements of suspension system 30. A split axle, comprised of two mirror image axle members 32, 34 interconnect rear wheels 20, 21 and main frame 16. Each axle member is made up of two telescoping members 36, 38 (since one side is the mirror image of the other, only one will be described in detail, though the same reference numbers will be used when describing components of both axle members), each having horizontal front-to-back holes therein that can be aligned and pinned or bolted to fix the distance at which telescoping member 38 extends outwardly beyond member 36. In this manner, the distance between wheels 20, 21 may be varied as required by the farming process being undertaken.

Wheel 21 is bolted to the axle of tailfork 40 which in turn has a generally vertically extending stub axle (not shown) fixed in a bearing housing 42 at the outer end of telescoping member 38. A flange 44 is affixed to the inner end portion of telescoping member 36 and is attached to main frame 16 by pin 46 for vertical pivotal movement thereabout. An air spring 50 is positioned toward the outward end of telescoping member 36 to work between main frame 16 and axle member 32. This interaction can be seen well in FIG. 4. A spring cover 52, affixed to main frame 16 where the inward side of the cover and the main frame are in contact, extends up and over and contacts the top of spring 50, and extends downwardly past telescoping member 36. Thus, the air springs absorb a great deal of the forces encountered by the wheels, and provide an independent suspension for the two axle members.

The two air springs 50, 51 are interconnected by air tubes 54, 56 that are joined by T-connector 58. The free leg of T-connector 58 is attached to second T-connector 60. One leg of T-connector 60 is attached to a relief valve 62 and the other to a tank valve 64. Tank valve 64 is used to pressurize the two air springs, and to adjust the pressure therein. Of course, it is not required for operation that the two air springs be interconnected; however, it filled individually, extra effort must be exerted to assure that they are at the same, or very nearly the same, pressure.

When the tractor is supporting the header, the primary weight distribution is focused on the front wheels 18. However, when the header is removed, as might be done for road transit, the rear wheels 20, 21 bear the greater weight. In fact, the weight is such that the axle members pivot substantially or fully to the maximum, causing the machine to "squat" at the rear end. Steering under these circumstances becomes difficult because the rear wheels cannot freely pivot within bearing housing 42. To overcome this problem, a pin 70 is provided for manual selective insertion through tube 72 which is rigidly affixed to telescoping member 36 (see FIGS. 3 and 4). FIG. 4 further shows that spring cover 52 is located closely adjacent one end of tube 72, such that pin 70 protrudes through tube 72 and a somewhat elongate slot 74 through the cover. Thus, insertion of pin 72 incapacitates the air spring and locks axle member 34 to main frame 16 in a generally horizontal position. The vertical location of pin 70 within the slot 74 also serves as a gauge to determine if the machine is level. If the pin is in the center of the slot, the windrower is substantially level. A snap or cotter pin 76 can be inserted through a hole in the end of pin 70 to hold it in position.

It will be understood that changes in the details, materials, steps and arrangements of parts which have been described and illustrated to explain the nature of the invention will occur to, and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following cairns are intended to protect the invention broadly as well as in the specific form shown.

Having thus described the invention, what is claimed is:

1. An agricultural windrower with a longitudinal axis extending between front and opposing rear ends, front and rear wheel pairs supporting a main frame, an engine and drive system supported by said main frame to supply motive power to said front wheel pair, said main frame adapted to support a removable crop-engaging header on said front end thereof, and a rear axle suspension system comprising:

a transverse member forming part of said main frame and located near said rear end of said windrower;

first and second suspension members, generally mirror images of each other, each said suspension member having an elongate axle member with first and second opposing ends, said first end vertically pivotably affixed to said transverse member about an axis generally parallel to and adjacent a vertical plane through said longitudinal axis;

said second end of each said axle member connected to a depending tailfork, said tailfork freely rotatable about a generally vertical axis and supported by one of said wheels making up said rear wheel pair;

first and second adjustable shock-absorbing units, said first and second shock-absorbing units interconnecting said respective first and second axle members and said main frame; and mechanisms for selectively locking said axle members in fixed relation to said transverse member, such that said first and second axle members are selectively, independently vertically movable relative to said main frame.

2. The windrower of claim 1, wherein:

said first and second shock-absorbing units comprise first and second air springs.

3. The windrower of claim 2, wherein:

said first and second air springs are in air flow communication with each other via a tubular conduit, said conduit including a relief valve and an input valve.

4. The windrower of claim 3, wherein:

said transverse member has first and second holes therethrough; and said first and second axle members each comprise first and second telescoping members, each of said telescoping members having at least one hole therethrough such that one of said at least one holes of said first telescoping members can be aligned with a respective one of said holes through said transverse member.

5. The windrower of claim 4, wherein:

said mechanisms for selectively locking said axle members comprise first and second pins that fit within said aligned boles in said first telescoping members and said transverse member.

6. The windrower of claim 5, wherein:

said telescoping members are rectangular in cross-section.

7. The windrower of claim 6, wherein:

said at least one hole through said second telescoping member is a plurality of holes and a bolt extends through one of said plurality of holes of said second telescoping member and one of said holes in said first telescoping member to adjust the distance between said rear wheels.

8. The windrower of claim 7, wherein:

said first and second holes through said transverse member are vertical slots.

9. In an agricultural self-propelled windrower with a longitudinal axis extending between front and opposing rear ends, front and rear wheel pairs supporting a main frame, an engine and drive system supported by said main frame to supply motive power to said front wheel pair, said main frame adapted to support a removable crop-engaging header on said front end there, of and a rear axle suspension system, the improvement Comprising:
    a transverse member forming part of said main frame and located near said rear end of said windrower;
    first and second suspension members, generally mirror images of each other, each said suspension member having an elongate axle member with first and second opposing ends, said first end vertically pivotably affixed to said transverse member about an axis generally parallel to and adjacent a veritical plane through said longitudinal axis;
    said second end of each said axle member connected to a depending tailfork, said tailfork freely rotatable about a generally vertical axis and supported by one of said wheels making up said rear wheel pair;
first and second adjustable shock-absorbing units, said first and second shock-absorbing units interconnecting said respective first and second axle members and said main frame; and
    mechanisms for selectively locking said axle members in fixed relation to said transverse member, such that said first and second axle members are selectively, independently vertically movable relative to said main frame.

10. The windrower of claim 9, wherein:
said first and second shock-absorbing units comprise first and second air springs.

11. The windrower of claim 10, wherein:
said first and second air springs are in air flow commuinication with each other via a tubular conduit, said conduit including a relief valve and an input valve.

12. The windrower of claim 11, wherein:
said transverse member has first and second holes therethrough; and
said first and second axle members each comprise first and second telescoping members, each of said telescoping members having at least one hole therethrough such that one of said at least one bolts of said first telescoping members can be aligned with a respective one of said holes through said transverse member.

13. The windrower of claim 12, wherein:
said mechanisms for selectively locking said axle members comprise first and second pins that fit within said aligned holes in said first telescoping members and said transverse member.

14. The windrower of claim 13, wherein:
said telescoping membors are rectangular in cross-section.

15. The windrower of claim 14, wherein:
said at least one hole through said second telescoping member is a plurality of holes and a bolt extends through one of said plurality of holes of said second telescoping member and one of said holes in said first telescoping member to adjust the distance between said rear wheels.

16. An agricultural self-propelled implement comprising:
a main frame with a longitudinal axis extending between front and opposing rear ends;
front and rear wheel pairs supporting said main frame;
a source of motive power supported by said main frame;
said main frame adapted to support a removable crop-engaging header on said front end thereof;
a rear axle suspension system comprising:
    a transverse member forming part of said main frame and located near said rear end of stud windrower;
first and second suspension members, genarally mirror images of each other, each said suspension member having an elongate axle member with first and second onposing ends, said first end vertically pivotably affixed to said transverse member about an axis generally parallel to and adjacent a vertical plane through said longitudinal axis;
said second end of each said axle member connected to a depending tailfork, said tailfork freely rotatable about a genarally vertical axis and supported by one of said wheels making up said rear wheel pair; first and second adjustable shock-absorbing units, said first and second shock-absorbing units interconnecting said respective first and second axle members and said main frame; and
mechanisms for selectively locking said axle members in fixed relation to said transverse member, such that said first and second axle members are selectively, independently vertically movable relative to said main frame.

17. The windrower of claim 16, wherein:
said first arid second shock-absorbing units comprise first and second air springs; and
said first and second air springs are in air flow communication with each other via a tubular conduit, said conduit including a relief valve and an input valve.

18. The windrower of claim 17, wherein:
said transverse member has first and second holes therethrough; and
said first and second axle members each comprise first and second telescoping members, each of said telescoping members having at least one hole therethrough such that one of said at least one holes of said first telescoping member can be aligned with a respective one of said holes through said transverse member.

19. The windrower of claim 18, wherein:
said mechanisms for selectively locking said axle members comprise first and second pins that fit within said aligned holes in said first telescoping members and said transverse member.

20. The windrower of claim 19, wherein:
said telescoping members are rectangular in cross-section; and
said at least one hole through said second telescoping member is a plurality of holes and a bolt extends through one of said plurality of holes of said second telescoping member and one of said holes in said first telescoping member to adjust the distance between said rear wheels.

\* \* \* \* \*